(No Model.)
J. A. GARBER.
CULTIVATOR HOE.
No. 422,761. Patented Mar. 4, 1890.
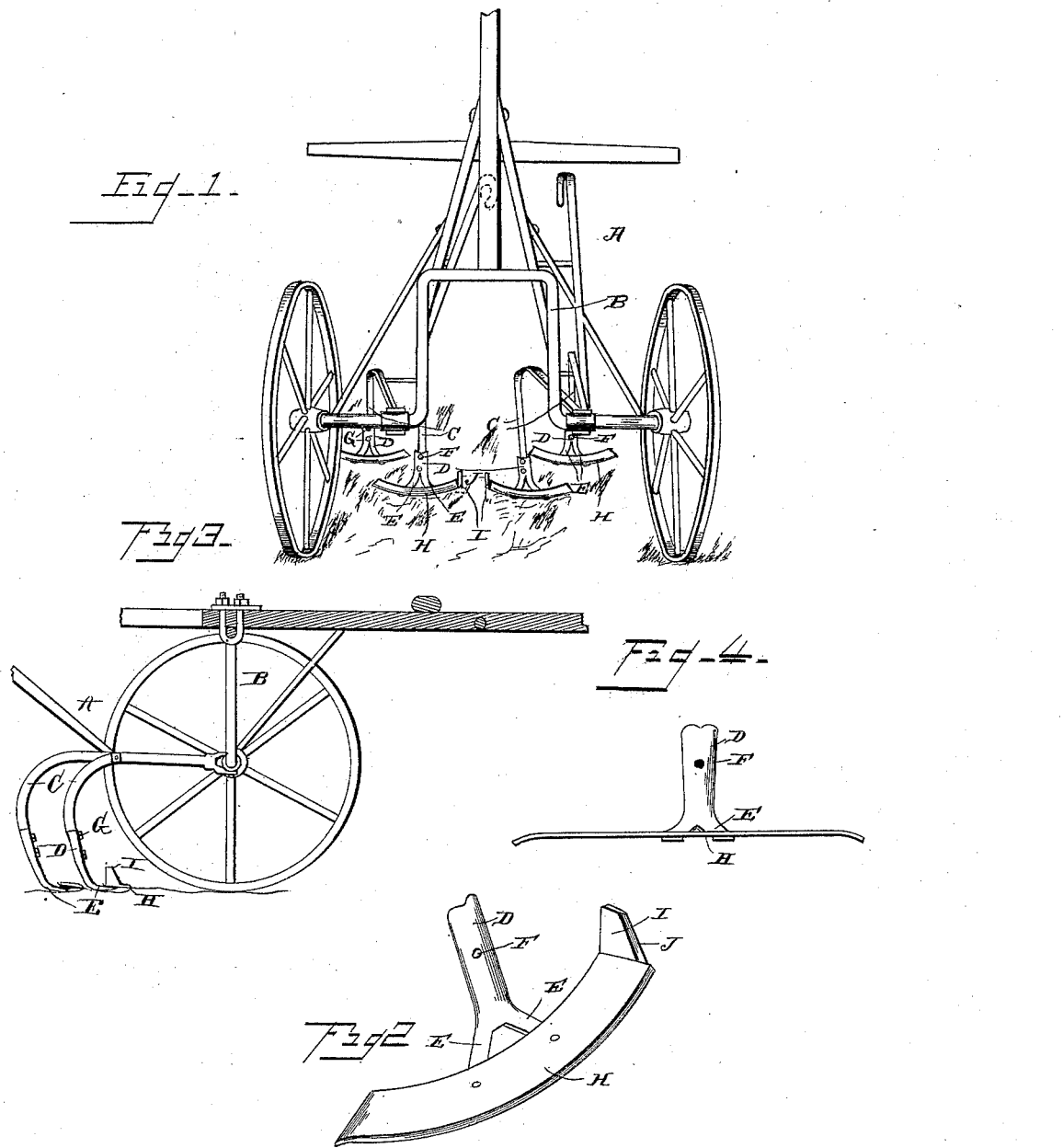
Witnesses
Geo. E. Fuch.
Wm. Bagger
Inventor
Joseph A. Garber.
By his Attorneys,
C. A. Snow & Co.

UNITED STATES PATENT OFFICE.

JOSEPH A. GARBER, OF HATTON, ASSIGNOR OF ONE-HALF TO VIRGIL S. JONES, OF SYRACUSE, KANSAS.

CULTIVATOR-HOE.

SPECIFICATION forming part of Letters Patent No. 422,761, dated March 4, 1890.

Application filed May 21, 1889. Serial No. 311,519. (No model.)

*To all whom it may concern:*

Be it known that I, JOSEPH A. GARBER, a citizen of the United States, residing at Hatton, in the county of Hamilton and State of Kansas, have invented a new and useful Cultivator-Hoe, of which the following is a specification.

This invention relates to an improved hoe or implement adapted to be attached to an ordinary cultivator-frame for the purpose of exterminating the weeds between rows of growing plants—such as corn or cotton, more particularly the latter; and it has for its object to provide a device of this class which shall be simple in construction and capable of being applied at a trifling expense to the frame of an ordinary horse cultivator, and which shall be adapted to cut under the soil, so as to sever the roots of the weeds and thoroughly eradicate the same.

The invention consists in the improved construction of the said attachments, which will be hereinafter described, with reference to the annexed drawings, in which—

Figure 1 is a front perspective view of a cultivator-frame to which my improved weeding implements have been attached, showing the tongue of the cultivator thrown back in a raised position. Fig. 2 is a perspective view showing the weeding implements detached from the frame. Fig. 3 is a longitudinal vertical sectional view of the cultivator-frame with the weeding implements attached. Fig. 4 is a front view of one of the weeding implements detached from the frame.

The same letters refer to the same parts in all the figures.

A designates the cultivator-frame, which may be of any suitable well-known construction, and which is preferably of the kind provided with an arched axle B, adapted to straddle the rows of growing plants. C C designate the standards, which are suitably connected with the cultivator-frame, and to the lower ends of which the cultivator blades or shovels are ordinarily attached. In the drawings hereto annexed, however, the said cultivator-shovels have been removed and replaced by the weeding implements which form the subject of my invention. Each of the said implements or weeders comprises a shank D, the lower end of which is bifurcated, as shown at E E, the arms thus formed being bent slightly in a forward direction. The shanks D are provided with perforations F to receive the bolts G, by means of which they are to be secured to the lower ends of the cultivator-standards. The shanks D are so constructed with relation to the forwardly-extending arms E that when the said shanks are attached to the cultivator-standards the said arms E shall extend forwardly in an approximately horizontal position.

H designates the cutting-blades, which are secured by means of bolts or rivets upon the upper sides of the forwardly-extending horizontal arms E E. The said cutting-blades have curved front and rear edges, which are approximately concentric, the front edges being sharpened so as to form cutting-edges. The said plates are made as thin as is consistent with sufficient strength to enable them to pass readily through the soil. Their outer ends are turned or curved slightly downwardly, so as to enable them to enter the soil without difficulty.

In Fig. 1 of the drawings hereto annexed the cultivator-frame has been shown provided with four of my improved weeding attachments, the two forward ones of which have been placed closely together, so as to pass on either side of the row of plants, while the rear ones overlap the outer ends of the forward ones, and are made of a width to extend fully to the middle of the rows. The front weeders are provided at their inner ends with flanges I, having beveled cutting-edges J, which also serve as guards or fingers to prevent injury to the growing plants.

The operation of this invention will be readily understood from the foregoing description, taken in connection with the drawings hereto annexed. The horizontal cutting-plates of the weeders will pass under the soil any desired distance, thus causing them to cut the roots of the weeds, which will thereby be effectually eradicated. The tops of the weeds may afterward be readily removed. The machine provided with my improved attachment may be guided equally as well as an ordinary cultivator. It is simple and efficient in operation and may be manufactured and applied to an ordinary cultivator-frame at a trifling expense.

Having thus described my invention, I claim and desire to secure by Letters Patent of the United States—

1. A weeding attachment comprising a shank provided at its lower end with forwardly-extending horizontal arms, in combination with a flat horizontal cutting-plate, mounted upon the said arms and having curved approximately concentric front and rear edges, the former of which is sharpened, and the ends of said cutting-plate being curved slightly in a downward direction, substantially as set forth.

2. In a weeding attachment for cultivator-frames, the combination, with a shank provided at its lower end with forwardly-extending horizontal arms, of a flat horizontal cutting-plate mounted upon said arms and having curved approximately concentric front and rear edges, and provided at its inner end with a vertical flange having a beveled cutting-edge, substantially as and for the purpose herein set forth.

In testimony that I claim the foregoing as my own I have hereto affixed my signature in presence of two witnesses.

JOSEPH A. GARBER.

Witnesses:
JOSEPH A. KALLANS,
JOHN MULLER.